US008180871B2

(12) United States Patent
Brittenham et al.

(10) Patent No.: US 8,180,871 B2

(45) Date of Patent: May 15, 2012

(54) DYNAMIC REDEPLOYMENT OF SERVICES IN A COMPUTING NETWORK

(75) Inventors: Peter J. Brittenham, Apex, NC (US); Douglas B. Davis, Raleigh, NC (US); David B. Lindquist, Raleigh, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2071 days.

(21) Appl. No.: 09/864,608

(22) Filed: May 23, 2001

(65) Prior Publication Data

US 2002/0178244 A1 Nov. 28, 2002

(51) Int. Cl.
*G06F 15/16* (2006.01)

(52) U.S. Cl. ........................................ 709/223; 709/224

(58) Field of Classification Search .................. 709/223, 709/224, 226, 229, 200–203, 217–222
See application file for complete search history.

(56) References Cited

U.S. PATENT DOCUMENTS

| | | | | |
|---|---|---|---|---|
| 5,341,477 A | | 8/1994 | Pitkin et al. | |
| 5,657,451 A | | 8/1997 | Khello | |
| 5,907,675 A | | 5/1999 | Aahlad | |
| 5,951,694 A | | 9/1999 | Choquier et al. | |
| 6,055,570 A | * | 4/2000 | Nielsen | 709/224 |
| 6,081,840 A | * | 6/2000 | Zhao | 709/224 |
| 6,094,680 A | | 7/2000 | Hokanson | |
| 6,167,444 A | * | 12/2000 | Boden et al. | 709/223 |
| 6,173,322 B1 | | 1/2001 | Hu | |
| 6,233,607 B1 | | 5/2001 | Taylor et al. | |
| 6,256,675 B1 | | 7/2001 | Rabinovich | |
| 6,324,543 B1 | * | 11/2001 | Cohen et al. | 707/200 |
| 6,363,411 B1 | * | 3/2002 | Dugan et al. | 709/202 |
| 6,418,452 B1 | * | 7/2002 | Kraft et al. | 707/200 |
| 6,421,727 B1 | | 7/2002 | Reifer et al. | |
| 6,549,932 B1 | | 4/2003 | McNally et al. | |
| 6,631,425 B1 | | 10/2003 | Helland et al. | |
| 6,631,512 B1 | * | 10/2003 | Onyeabor | 717/100 |
| 6,654,610 B1 | * | 11/2003 | Chen et al. | 455/450 |
| 6,704,024 B2 | * | 3/2004 | Robotham et al. | 345/581 |
| 6,745,241 B1 | | 6/2004 | French et al. | |
| 6,779,032 B1 | * | 8/2004 | Hericourt | 709/226 |
| 6,857,012 B2 | | 2/2005 | Sim et al. | |
| 2002/0078167 A1 | | 6/2002 | Shavit et al. | |
| 2002/0104071 A1 | | 8/2002 | Charisius et al. | |

* cited by examiner

*Primary Examiner* — Moustafa M Meky

(74) *Attorney, Agent, or Firm* — Cuenot, Forsythe & Kim, LLC

(57) ABSTRACT

Methods, systems, and computer program products for improving network operations by dynamically redeploying services (such as web services or other network-accessible services) in a computing network. A programmatic replication or redeployment process is defined, whereby system upgrades may be implemented by redeploying services dynamically, without human intervention, enabling the complexity of upgrading previously-deployed software to be reduced significantly.

20 Claims, 13 Drawing Sheets

| UDDI Binding Key | POP | Usage Counter |
|---|---|---|
| xxx | San. Fran. | 100 |
| xxx | NYC | 33 |

```
<?xml version="1.0"?>
<definitions name="Deployment-interface"
  targetNamespace="http://www.acme.com/Deployment-interface"
  xmlns:xsd="http://www.w3.org/2000/10/XMLSchema"
  xmlns:xsd1="http://www.acme.com/deploy/schema"
  xmlns:soap="http://schemas.xmlsoap.org/wsdl/soap/"
  xmlns="http://schemas.xmlsoap.org/wsdl/">

  <types>
    <schema targetNamespace="http://www.acme.com/deploy/schema"
              xmlns="http://www.w3.org/2000/10/XMLSchema">
      <element name="ArchiveRef">
        <attribute name="href" type="uriReference"/>
      </element>
      <complexType name="ArrayOfBinary">
        <complexContent>
          <restriction base="soapenc:Array">
            <attribute ref="soapenc:arrayType" arrayType="xsd:binary[]"/>
          </restriction>
        </complexContent>
      </complexType>
    </schema>
  </types>

  <message name="DeploymentRequest">
    <part name="serviceName" type="xsd:string"/>
    <part name="runtimeEnvironment" type="xsd:string"/>
  </message>

  <message name="DeploymentResponse">
    <part name="archiveRef" element="xsd1:ArchiveRef"/>
    <part name="serviceArchive" type="xsd1:ArrayOfBinary"/>
  </message>
```

```
    <portType name="DeploymentProvider">
540  <operation name="getDeployedService">
       <input message="tns:DeploymentRequest"/>
       <output message="tns:DeploymentResponse"/>
     </operation>
    </portType>

    <binding name="DeploymentProviderBinding" type="tns:DeploymentProvider">
      <soap:binding style="rpc"
                    transport="http://schemas.xmlsoap.org/soap/http"/>
      <operation name="getDeployedService">
        <soap:operation soapAction="http://www.acme.com/deploy"/>
        <input>
          <soap:body use="encoded"
                namespace="urn:www.acme.com:deploy"
                encodingStyle="http://schemas.xmlsoap.org/soap/encoding/" />
        </input>
        <output>
          <mime:multipartRelated>
          <mime:part>
            <soap:body parts="archiveRef" use="literal"
                   namespace="urn:www.acme.com:deploy"/>
          </mime:part>                                                  550     560
          <mime:part>
            <mime:content part="serviceArchive"
                          type="application/octet-stream"/>
          </mime:part>
          </mime:multipartRelated>
        </output>
      </operation>
    </binding>
  </definitions>
```

FIG. 5C

```
<?xml version="1.0"?>
<definitions name="Deployment"
  targetNamespace="http://www.acme.com/Deployment"
  xmlns:xsd="http://www.w3.org/2000/10/XMLSchema"
  xmlns:soap="http://schemas.xmlsoap.org/wsdl/soap/"
  xmlns:interface="http://www.acme.com/Deployment-interface"
  xmlns="http://schemas.xmlsoap.org/wsdl/">

  <import namespace="http://www.acme.com/Deployment-interface"
          location="http://www.acme.com:80/services/Deployment-interface.wsdl"/>

  <service name="DeploymentProvider">
    <documentation>Acme.Com Deployment Service</documentation>
    <port name="DeploymentProvider" binding="interface:DeploymentProviderBinding">
      <soap:address location="http://www.acme.com:80/soap/servlet/rpcrouter"/>
    </port>
  </service>
</definitions>
```

FIG. 6

```
POST /ServiceDeployment HTTP/1.1
Host: www.acme.com
Content-Type: text/xml; charset="utf-8"
Content-Length: nnnn
SOAPAction: "http://www.acme.com/deploy"

<SOAP-ENV:Envelope
  xmlns:SOAP-ENV="http://schemas.xmlsoap.org/soap/envelope/"
  SOAP-ENV:encodingStyle="http://schemas.xmlsoap.org/soap/encoding/">
   <SOAP-ENV:Body>
     <m:getDeployedService xmlns:m="urn:www.acme.com:deploy">
610   <serviceName>urn:www.acme.com:stockquoteservice</serviceName>
620   <runtimeEnvironment>Windows 2000, Apache SOAP V2.1,
                                  Java</runtimeEnvironment>
     </m:getDeployedService>
   </SOAP-ENV:Body>
</SOAP-ENV:Envelope>
```

FIG. 7

```
HTTP/1.1 200 OK
MIME-Version: 1.0
Content-Type: Multipart/Related; boundary=MIME_boundary; type=text/xml;
start="<http://www.acme.com/deployment061400a.xml>"
Content-Description: This is the optional message description.

--MIME_boundary
Content-Type: text/xml; charset=UTF-8
Content-Transfer-Encoding: 8bit
Content-ID: <http://www.acme.com/deployment061400a.xml>
Content-Location: http://www.acme.com/deployment061400a.xml

<?xml version='1.0' ?>
<SOAP-ENV:Envelope xmlns:SOAP-ENV="
http://schemas.xmlsoap.org/soap/envelope/">
  <SOAP-ENV:Body>
    <m:getDeployedServiceResponse xmlns:m="urn:www.acme.com:deploy">
710 <ArchiveRef href="http://www.acme.com/com/foo/stockqouteservice.ear" />
    </m:getDeployedServiceResponse>
  ...
  </SOAP-ENV:Body>
</SOAP-ENV:Envelope>

--MIME_boundary

Content-Type: application/octet-stream
Content-Transfer-Encoding: binary
720 Content-ID: <http://www.acme.com/com/foo/stockqouteservice.ear>
Content-Location: http://www.acme.com/foo/stockqouteservice.ear

730 ... binary EAR file ...
--MIME_boundary--
```

| Deployed Service 910 | Deployed to 920 |
|---|---|
| xxx | 1.2.3.4 |
| xxx | 4.3.2.1 |
| yyy | 1.2.3.4 |
| zzz | 5.6.7.8 |

DYNAMIC REDEPLOYMENT OF SERVICES IN A COMPUTING NETWORK

The present invention is related to U.S. patent application Ser. No. 09/864,663 (published as Publication No. US 2002/0178254), which is titled "Dynamic Deployment of Services in a Computing Network", and U.S. patent application Ser. No. 09/864,607 (published as Publication No. US 2002/0178214), which is titled "Dynamic Undeployment of Services in a Computing Network", both are which are commonly assigned to International Business Machines Corporation and which were filed concurrently herewith.

BACKGROUND OF THE INVENTION

1. Field of the Invention

The present invention relates to computer networks, and deals more particularly with methods, systems, and computer program products for dynamically redeploying services (such as web services or other network-accessible services) at various sites within a network.

2. Description of the Related Art

Web services technology is rapidly emerging as a mechanism for distributed application integration. In general, a "web service" is an interface that describes a collection of network-accessible operations. Web services fulfill a specific task or a set of tasks. They may work with one or more other web services in an interoperable manner to carry out their part of a complex workflow or a business transaction. For example, completing a complex purchase order transaction may require automated interaction between an order placement service (i.e. order placement software) at the ordering business and an order fulfillment service at one or more of its business partners.

Many industry experts consider the service-oriented web services initiative to be the next evolutionary phase of the Internet. With web services, distributed network access to software win become widely available for program-to-program operation, without requiring intervention from humans. Whereas the early Internet served primarily as a distributed file system in which human users could request delivery of already-generated static documents, the trend in recent years has been to add more and more dynamic and personalized aspects into the content that is served to requesters. Typically, this dynamic and personalized content has been generated in the enterprise network. This approach, however, places a heavy demand on the enterprise computing resources. Several techniques have been developed for alleviating the processing burden on back-end servers, including caching of static content (and to a limited extent, caching of content after it has been dynamically generated); workload balancing; and content distribution.

Caching attempts to avoid repeated generation of content by storing content and serving it to subsequent requesters whenever possible. Serving cached content not only reduces the workload on the back-end computing resources, but it also improves response time to the user. Workload balancing improves the performance of a Web site by dynamically adjusting the amount of work sent to each server in a clustered group of servers. Content distribution attempts to proactively (statically) publish static content to various locations in the network, for example to cache servers in order to increase the likelihood that requests can be served from cache. Content Distribution Service Providers ("CDSPs") offer a valuable service by providing access to their broad network infrastructure for caching of static content in close proximity to the end user. This, in turn, enables enterprises to scale their operations in a cost-effective manner. Dynamic content distribution (i.e. dynamically moving generated content closer to users) would yield the same scalability benefits. For some applications (e.g. those which provide session management within their presentation logic, and which only access the back-end business logic in batch mode), it may be possible to (statically) deploy the presentation logic at the edge. In these cases, the content distribution process will typically result in reduced response time as well.

Use of "edge servers" in a network configuration provides increased network efficiency and availability by caching static application components (such as images, forms, etc.) near the edge of the network, where they can be quickly returned to a requester (or quickly retrieved by presentation logic for use in assembling a response to be delivered to a requester). An edge server is a server which is physically located at or near the edge of a network. Edge servers may perform workload balancing, and are sometimes referred to as distributed web caches, surrogates, and/or proxies. (The IBM WebSphere® Edge Server, for example, performs workload balancing and also functions as a reverse proxy and/or cache server.) FIG. 1 provides a diagram of a representative server site 100 (i.e. a collection of server nodes that serve web content associated with a given fully-qualified domain name) within a network, which may (for purposes of example) serve content for a domain name such as "www.ibm.com". This example server site 100 comprises a cluster 150 of application servers 140 (such as IBM WebSphere application servers); several back-end enterprise data servers 160 (such as IBM OS/390® servers running the DB/2, CICS®, and/or MQI products from IBM); several Web servers 130 (such as Apache, Netscape, or Microsoft servers; note that the application server and Web server are often co-resident in a single hardware box); several firewalls 110; and several edge servers or reverse proxies/caches/load balancers 120. ("WebSphere", "OS/390", and "CICS" are registered trademarks of IBM.)

The next generation of edge server technology will bring some dynamic aspects of application programs to the edge of the network. This will be accomplished via hosting web applications at the network edge and statically deploying presentation logic (such as servlets, JSP™, PHP, etc.) at those edge servers. JSP, or JavaServer Pages™, is presentation logic represented using scripting commands for dynamically embedding content into Web documents. ("JSP" and "JavaServer Pages" are trademarks of Sun Microsystems, Inc.) PHP ("personal Home Page") is another scripting language that may be used to embed content in Web documents dynamically.

Web services will facilitate "just-in-time" application integration via open web-based standards, such as HTTP ("Hypertext Transfer Protocol"), SOAP ("Simple Object Access Protocol") and/or XML ("Extensible Markup Language") Protocol, WSDL ("Web Services Description Language"), and UDDI ("Universal Description, Discovery, and Integration"). HTTP is commonly used to exchange messages over TCP/IP ("Transmission Control Protocol/Internet Protocol") networks such as the Internet. SOAP is an XML-based protocol used to invoke methods in a distributed environment. XML Protocol is an evolving specification of the World Wide Web Consortium ("W3C") for an application-layer transfer protocol that will enable application-to-application messaging. XML Protocol may converge with SOAP. WSDL is an XML format for describing distributed network services. UDDI is an XML-based registry technique with which businesses may list their services and with which service requesters may find businesses providing particular services. Just-in-time application integration will be possible by issuing UDDI requests to locate distributed services through a UDDI registry, and dynamically binding the requester to a located service using service information which is conveyed in a platform-neutral WSDL format using SOAP/XML Protocol and HTTP messages. (Hereinafter, references to SOAP should be construed as referring equivalently to semantically similar aspects of XML Protocol.) Using these components, web services will provide requesters with transparent access to program components which may reside in one or more remote locations, even though those components might run on different operating systems and be written in different programming languages than those of the requester. HTTP is described in Request For Comments ("RFC") 2616 from the Internet Engineering Task Force, titled "Hypertext Transfer Protocol—HTTP/1.1" (June 1999).)

While statically deploying presentation logic at the edge of the network lessens some of the burden on back-end computing resources and will improve response times for those content requests which do not require executing back-end business logic, there will still be many requests which must be sent into the enterprise for content generation. When the business logic remains within the heart of the enterprise, network efficiencies are not realized and the enterprise may continue to be a processing bottleneck and a limiting factor in growth of the business. Furthermore, the static deployment of presentation logic at the network edge is only efficient so long as usage patterns remain constant and predictable: if the usage patterns change, the statically deployed logic might no longer be highly leveraged. In addition, static deployment of software in this manner will likely increase administration complexity, specifically for software upgrades, as a means must be provided for recording which levels of software have been deployed at which systems and for modifying the deployed software when necessary. This upgrade process is often manual, and requires tedious, error-prone work. And, while web services will make distributed software resources more widely available, it is likely that the physical location of some services will result in less-than-optimal response time for large numbers of remote service requesters.

Accordingly, what is needed is a technique for avoiding these drawbacks and limitations of the prior art.

SUMMARY OF THE INVENTION

An object of the present invention is to provide a technique for dynamically redeploying network-accessible services (including, but not limited to, web services) in a distributed network.

A further object of the present invention is to provide a technique for efficiently updating deployed network-accessible services dynamically.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for dynamically redeploying services in a computing network. In preferred embodiments, this technique comprises: receiving a redeployment trigger for a selected service; determining one or more network locations where the selected service has been deployed from its original location at an origin server; programmatically removing the selected service from the network locations and the origin server; and programmatically replacing the selected service at the network locations and the origin server.

The present invention may also be used advantageously in methods of doing business, for example by offering dynamic redeployment services that will result in more efficient web hosting sites (which provide, for example, for updating deployed services with more quickly and with less effort than is currently required).

The present invention will now be described with reference to the following drawings, in which like reference numbers denote the same element throughout.

BRIEF DESCRIPTION OF THE DRAWINGS

FIG. 3 illustrates a data structure that may be used to accumulate usage metrics for use with the present invention;

FIG. 5 illustrates the content of a sample deployment request which may issued, according to preferred embodiments of the present invention;

FIG. 6 illustrates the content of a SOAP request which may issued in response to receiving the message in FIG. 5, according to preferred embodiments of the present invention;

FIG. 7 illustrates the content of a sample SOAP envelope that may be returned as a response to the deployment request of FIG. 6, according to preferred embodiments of the present invention;

FIG. 9 illustrates a data structure that may be used to record deployment locations for deployed services.

DESCRIPTION OF PREFERRED EMBODIMENTS

Figure 1:
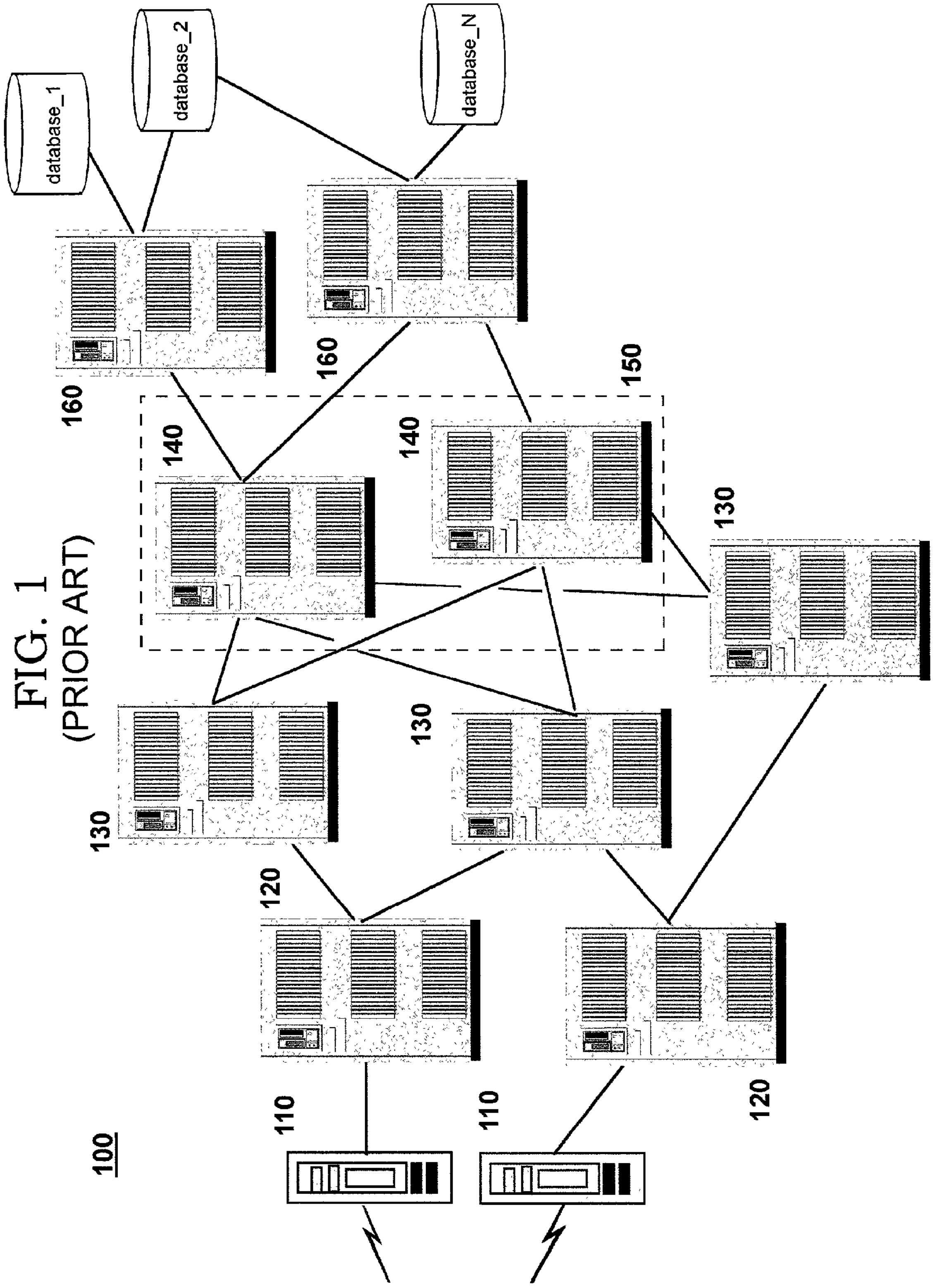
FIG. 1 is a diagram of a server site in which edge servers route incoming content requests, according to the prior art.

The present invention defines techniques for improving network operations by dynamically deploying network-accessible services, and thereby addresses the shortcomings of the prior art. In addition, the complexity of upgrading previously-deployed software is reduced via automated, programmatic replication of system upgrades through an optional enhancement based on this same dynamic deployment mechanism. In another optional enhancement, previously-deployed software may also be automatically and programmatically undeployed using the techniques of the present invention. (Note that while preferred embodiments of the present invention are described herein as operating at the edge of a network, these techniques may also be adapted for use at the front-end of a server farm, as will be obvious to one of skill in the art. Furthermore, while preferred embodiments are described herein as pertaining to use with web services, this is for purposes of illustration and not of limitation. The disclosed techniques may also be used advantageously with other types of network-accessible services.)

According to preferred embodiments, usage metrics are computed dynamically based upon incoming client requests for particular web services. By deploying services dynamically as a function of user demand, the right software will be accessible from the edge, even in cases of rapidly fluctuating usage patterns.

In general, web services may encapsulate any form of programming logic, including script programs, Java™ classes, COM classes, EJBs ("Enterprise JavaBeans"™), stored procedures, IMS or other database transactions, etc., as is known in the art. ("Java" and "Enterprise JavaBeans" are trademarks of Sun Microsystems, Inc.) As web services are operating system, component model, and programming language neutral, the prior art restriction of deploying only presentation logic at the edge is removed when using the present invention (assuming the necessary run-times exist at the point of deployment, as will be described in more detail below). Thus, the network efficiencies which are gained in the prior art from the caching of static content may now be realized for content that is truly dynamic in nature as well.

The term "usage metrics" is used herein to refer to gathered information about the number of times a particular web service is requested. A threshold may be set for a usage counter and may be used to determine when a service is being requested often enough that efficiencies may be realized by deploying the service to an edge server. In some implementations of the present invention, it may be desirable to use a single threshold for all web services; in other implementations, it may be desirable to provide for multiple threshold values (including a different threshold for each individual web service). Typically, the value of the threshold(s) will be set by a systems administrator when configuring network parameters. (Alternatively, default values may be used for some threshold values, and/or some threshold values may be set programmatically.)

Figure 2:
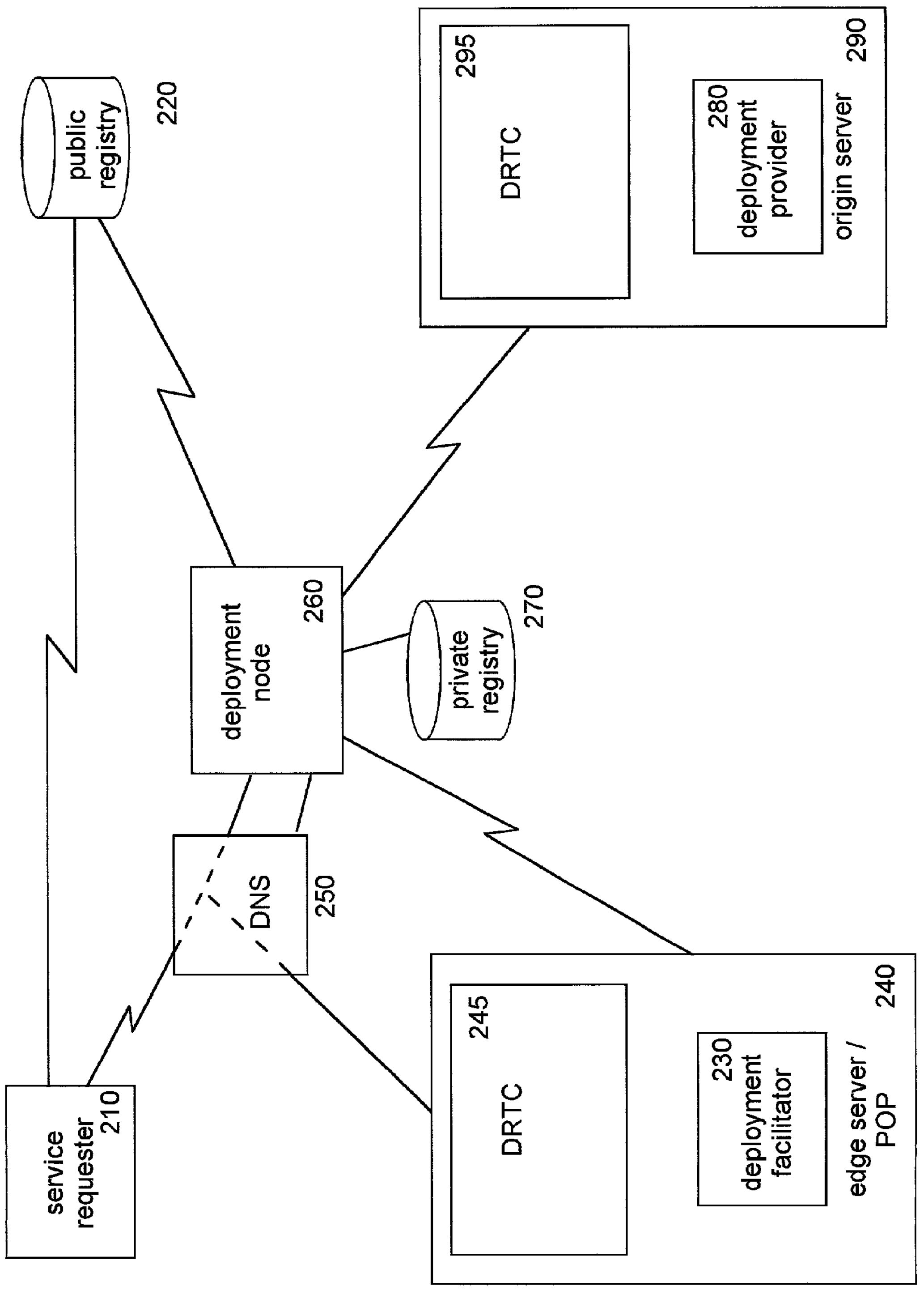
FIG. 2 provides a diagram illustrating components of the present invention and their placement and interconnection within a network configuration.

The dynamic deployment technique of the present invention may operate within a network configuration such as the sample network shown in FIG. 1, where the edge servers 120 are modified to enable dynamic deployment as described herein. FIG. 2 shows an abstract representation of a network configuration in which the present invention may operate, illustrating placement of components that perform the dynamic deployment process and their network interconnection. These components will now be described.

As shown in FIG. 2, the components of the deployment system comprise a Point of Presence ("POP") Deployment Facilitator 230 (also referred to herein as the "deployment facilitator" or "DF"), a CDSP Deployment Node 260 (also referred to herein as the "deployment node" or "DN"), and a Deployment Provider 280 ("DP"). Optionally, a deployment run-time container ("DRTC") 245 may be provided. (The DRTC is used for optional enhancements of the present invention which provide for undeployment and redeployment, as discussed below. The DRTC may also be used in the dynamic deployment system, if desired.) In addition, a service requester 210 (e.g. a client application), a public UDDI registry 220, an edge server or POP 240, a Domain Name System ("DNS")-based host resolution system 250, a private UDDI registry 270, and an origin server 290 are shown. Elements 210, 220, 240, 250, 270, and 290 are generally known in the art (with the exception of the dynamic deployment, undeployment, and redeployment functions to be described herein), and these existing elements will not be described in detail herein.

The deployment facilitator component 230 resides on an edge server 240 and will coordinate deployment of web services from one or more origin servers 290 to the CDSP access point which is co-located with the DF 230, as will be described in more detail with reference to FIG. 4.

In preferred embodiments, the deployment node 260 stores usage metrics for this CDSP, and updates these metrics as it monitors incoming service requests. Upon reaching a threshold usage value, the deployment node is responsible for initiating the deployment of the corresponding service to a particular POP (e.g. to a particular edge server). The deployment node further comprises a private UDDI registry 270, which manages the current state of the service deployments for this specific CDSP. As used herein, the private UDDI node is preferably a partner catalog UDDI node which is hosted within the CDSP's firewall, and which allows only vetted partners to publish their services for inclusion in its UDDI registry. In addition, only requesters within the organization (i.e. behind the firewall) are allowed to request information from this private UDDI node. By replicating the contents of the private UDDI registry 270 with public UDDI registry 220, requesters outside the organization are able to request services which are located within the organization.

Note that UDDI registry 220 may alternatively be a portal UDDI node (i.e. another type of private node) which is hosted in the CDSP's demilitarized zone ("DMZ"). A portal UDDI node allows any requester to find services, but only allows the CDSP to publish to it.

CDSPs of the prior art typically provide an internal service which includes a DNS 250 for dynamically locating a server which provides requested content, ping triangulation means for determining the geographic location of a requester, and IP address maps which are used to transparently redirect client requests to the appropriate POP (i.e. to a POP which is located relatively near to the requester) given a common request URL ("Uniform Resource Locator"). According to the present invention, the DN 260 will interact with such a system such that dynamic service deployments will be reflected to the client transparently. (That is, the client will ask for a particular service, and the DNS system will determine where that service is currently deployed and automatically route the client's request to that current location.) This transparent redirection is discussed in more detail below with reference to FIG. 4.

The deployment provider 280 exists within the enterprise network, preferably at an origin server 290, and will respond to deployment requests in order to automatically and programmatically deploy a service to a requesting edge server 240. It is assumed that the "edgeable" aspects of a service application (that is, those aspects which are capable of deployment to the edge of the network) will be packaged and stored within the deployment provider's context appropriately (i.e. as an Enterprise Archive ("EAR"), as a Web Archive ("WAR"), as a Java archive ("JAR"), etc.)

A data structure that may be used by preferred embodiments of the present invention is illustrated in FIG. 3. In preferred embodiments, this data structure is used by DN 260 to store usage counts for particular services at individual POPs. (In some embodiments, it may be desirable to track and deployed services based upon usage metrics which reflect system-wide activity.) As shown in FIG. 3, the services are preferably identified by their UDDI binding keys. (Alternatively, they may be identified by their service name or other similar identifier, service provider, and ultimate end point.) The data structure is referred to herein as a "table" for purposes of illustration, and the service information stored therein is shown as having a distinct row for each POP managed by the CDSP.

In preferred embodiments, a process which is described herein using 12 stages is used for deploying web services dynamically. A standards-based web services platform is preferably leveraged in this deployment process, where that platform includes SOAP, WSDL, UDDI, and HTTP message flows. A specification being promulgated by W3C which is titled "SOAP Messages with Attachments, W3C Note Dec. 11, 2000" (see http://www.w3.org/TR/2000/NOTE-SOAP-attachments-20001211) describes a standard way to associate a SOAP message with one or more attachments in their native format using a multipart MIME ("Multi-purpose Internet Mail Extensions") structure for transporting the attachments. As SOAP is the standard messaging format for invoking web services, this SOAP attachment standard is used in preferred embodiments of the present invention as the mechanism for dynamically deploying web services. As will be obvious, semantically similar components may be substituted for those described herein without deviating from the scope of the present invention. For example, SMTP ("Simple Mail Transfer Protocol") flows may be used instead of HTTP flows in some embodiments, and as stated earlier, XML Protocol may be used instead of SOAP.

Figure 4:
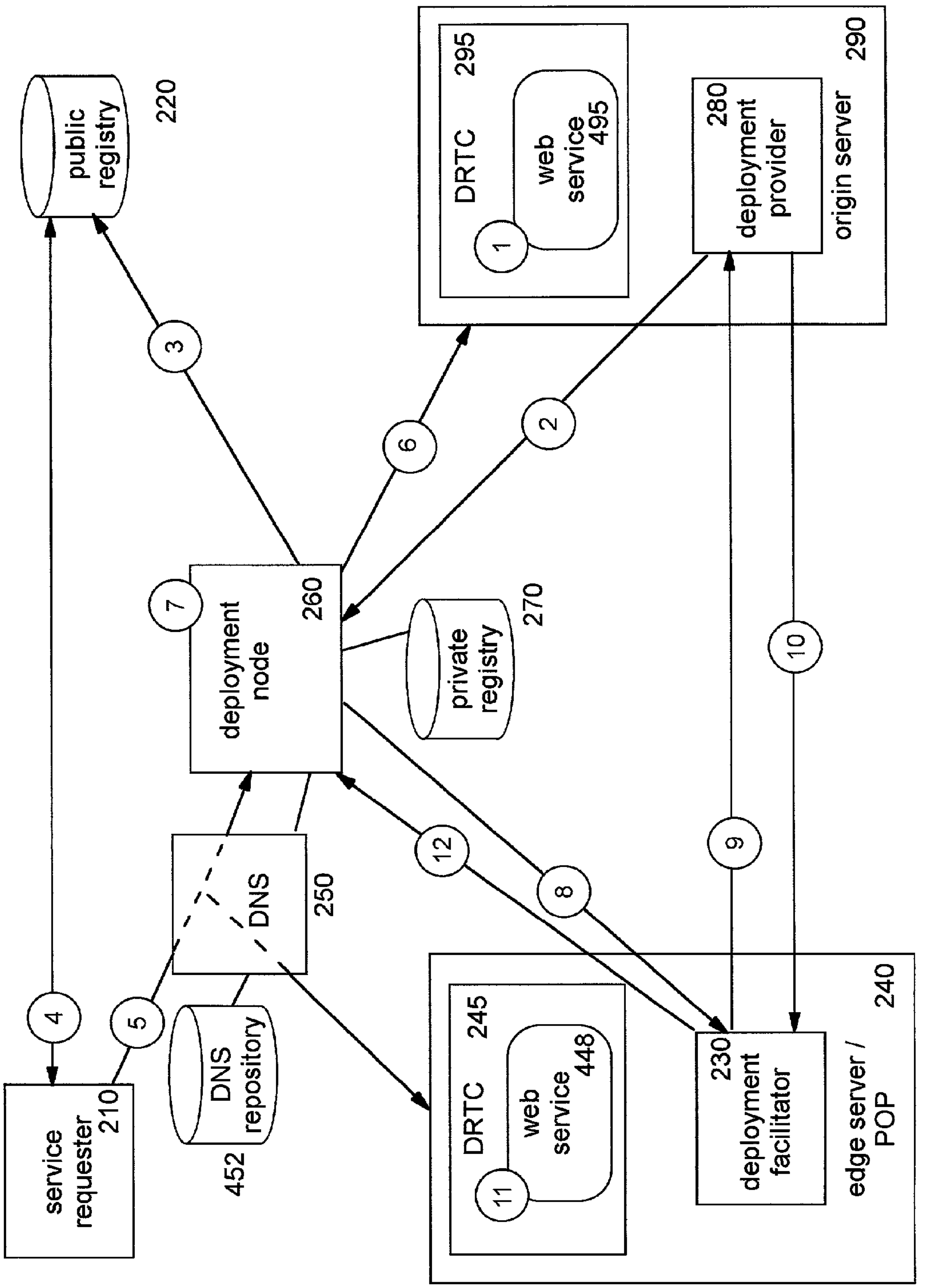
FIG. 4 illustrates a 12-stage process with which dynamic service deployment may be performed, according to preferred embodiments of the present invention.

FIG. 4 uses encircled numerals to indicate each of the stages in the 12-stage process of the preferred embodiments, in terms of the components which were depicted in FIG. 2. Each of the 12 stages will now be described with reference to FIG. 4.

In stage 1, a web service 495 is deployed at an origin server 290. This stage uses prior art deployment techniques which do not form part of the present invention. The web service 495 is then published (stage 2) to the deployment node 260. In preferred embodiments, this publish operation uses the UDDI Programmer's API ("Application Program Interface") to transmit a WSDL document from origin server 290 to deployment node 260 for storage in the private UDDI registry 270. (The UDDI Programmer's API may be found at http://www.uddi.org/pubs/ProgrammersAP1-V1-1.pdf, and is titled "UDDI Programmer's API 1.0, UDDI Open Draft Specification Sep. 30, 2000".) The transmitted WSDL document describes the deployed service, using the format specified in the WSDL specification. In addition to storing the WSDL document in the registry 270, the deployment node 260 also preferably stores provider meta-data associated with this document (such as the network location of the origin server 290 which sent the document).

In stage 3, the deployment node 260 replicates its private UDDI registry 270 with public UDDI registry 220, preferably using a UDDI command (such as "save_service") of the "publish" API. For example, the following HTTP request may be used to publish information to a test-level IBM registry named "testregistry":

http://www-3.ibm.com/services/uddi/testregistry/protect/publishapi

The deployment node 260 also preferably updates the DNS entries in repository 452 at this point, so that DNS 250 will automatically cause subsequent client requests for this web service 495 to be routed to the deployment node 260. (The deployment node will then forward these subsequent requests to the proper location of web service 495, using information stored in the data structure shown at 300 in FIG. 3. The DN's processing of incoming client requests is described in more detail below, with reference to stage 5.) The DN also preferably creates an initial entry in its table 300, comprising the UDDI binding key for this published service and having a zero value for the usage count.

Optionally, a hosting redirector relationship may be established between the private UDDI registry 270 (i.e. partner catalog) and the public UDDI operator node at 220. This relationship enables any "find" requests to the public node to reference the entries in the private node. In this case, the triangulation process described in stage 5 is not needed when routing requests.

In stage 4, a client (i.e. service requester) 210 issues a UDDI command such as "find_service" from the "inquiry" API to interrogate the public UDDI registry 220 for the location of a particular service. As an example, the following HTTP request may be used to inquire into the location of a service using the registry named "testregistry":

http://www-3.ibm.com/services/uddi/testregistry/inquiryapi

According to preferred embodiments of the present invention, the resolved service definition will contain end point information which references the URL of deployment node 260 (thereby causing client 210 to send its subsequent request to the DN). Alternatively, if a hosting redirector approach is used, then the UDDI binding template will provide a binding key "A" referencing a second binding template "B" managed by the deployment node. Binding template "B" will provide the "access point" element for the redirection service hosted at the deployment node. This redirection service will respond to get_bindingDetail messages given the appropriate binding key "A" with a binding template which provides the access point for the desired service.

The client then issues a service request (stage 5), depicted in FIG. 4 as "binding" to the service. Using the end point information obtained from UDDI registry 220 in stage 4, this service request is routed to the deployment node 260. The CDSP's DNS function 250 intercepts this request and obtains a current location of the requested service from its DNS repository 452. If the service has already been deployed at the client's POP 240 (which may be determined using techniques such as ping triangulation to determine where the client is, and IP maps to find the client's POP, or via the hosting redirector relationship), then the request is routed to that POP for processing (as shown in FIG. 4). If the service has not yet been deployed at the client's POP, then processing occurs as in stage 6.

At stage 6, the deployment node receives the client's service request and forwards it on to the origin server 290 where the requested web service 495 is currently deployed. The service is processed at the origin server, and the service results are returned to the client (not shown in FIG. 4).

After the deployment node receives each service request, in stage 7 of preferred embodiments it updates the usage metrics for the service to reflect the client request. (Refer to the table in FIG. 3, where the DN deployment node preferably maintains information for client requests.) If the service has been accessed previously, the usage counter is incremented. If this is the first request issued for the service, the usage counter is set to 1. The example in FIG. 3 shows that a service having the UDDI binding key "xxx" has been requested 100 times from the San Francisco-based POP but only 33 times from the New York City-based POP.

After updating the usage metric, in stage 8 the DN 260 checks to see if the usage counter is equal or greater to the threshold value which was configured by the administrator (or otherwise set). If it is, this indicates that the service should be deployed to the client's POP. That is, clients of this POP are requesting the service sufficiently often that it appears to be useful and efficient to deploy a copy of the service at the local POP (e.g. to reduce network round-trip times and thereby improve response time to the client, as well as to reduce the transmission and processing burden within the back-end system). Therefore, the deployment node will issue a deployment request to the deployment facilitator (shown in FIG. 4 as flow 8) at the appropriate POP 240. This deployment request preferably provides the service description which can be used to initiate a deployment from the deployment provider 280.

FIG. 5 shows a sample deployment request, containing a service description which is encoded using WSDL.

As will be obvious to one familiar with WSDL encoding, the sample deployment request in FIGS. 5A and 5B specifies an interface definition. In this example, the interface definition is that of the deployment service of the present invention. As shown at 510, the example interface is named "Deployment-interface" and is invoked using a "getDeployedService" method 540 (see FIG. 5B). Two messages "DeploymentRequest" 520 and "DeploymentResponse" 530 are defined. The DeploymentRequest message includes a "runtimeEnvironment" part, whereby a deployment facilitator may specify POP-specific information to be used by the deployment provider when preparing a particular service for deployment at that POP (as discussed in more detail below with reference to stage 9). A binding is defined which provides mappings between the WSDL operations and messages to SOAP, as shown at 550. The result of invoking the Deploy method is either an archive reference or a service archive (see element 560). FIG. 5C specifies an implementation definition of the deployment service, which is also sent in stage 8.

In stage 9, the deployment facilitator 230 at the client's POP then issues a SOAP request to the deployment provider 280, using the information obtained from the deployment node 260 in stage 8, where this SOAP request asks that the service in question be deployed dynamically. An example of the SOAP request which may be transmitted in stage 9 is shown in FIG. 6. Note that the name or other identifier of the service to be deployed is specified as the content of a tag such as "serviceName" 610. In this example, the unique service identifier "urn:www.acme.com:stockquoteservice" has been specified, indicating that the "stockquoteservice" service requested by client 210 and located at "www.acme.com" is to be dynamically deployed.

In environments where the run-time environment on the POPs is known and is consistent for each POP to which a particular service will be deployed, the deployment request sent in stage 9 need only identify the requested service. As an example, this simple approach is appropriate if the requested service is written in Java and each POP has a Java run-time, if each POP is running the same operating system, and if each POP supports the same version of SOAP and thus understands the same deployment message syntax. However, in many networking environments there may be differences in these types of information among the different POPs. For example, different SOAP servers might be running at some POPs, where these servers have different ways of deploying services. Or, the requested web service might be written in a language which is not portable. Therefore, multiple versions of each service to be deployed may be stored at the origin server (or in a repository which is accessible to the origin server). A different version of the service can then be sent to particular POPs, depending on the support available at that POP. For example, a COM application for a Windows operating system may be deployed to one requester of a particular service, whereas this same service might be deployed as a C program to a POP running a Linux™ operating system. ("Linux" is a trademark of Linus Torvalds.) Therefore, preferred embodiments of the present invention support the "runtimeEnvironment" element which was defined in 520 of FIG. 5A to allow the POP to provide information on its configuration to the deployment provider when requesting deployment of a service. In FIG. 6, an example of this technique is illustrated at 620, where the deployment facilitator has provided several types of runtime information. In this example, the information includes the name of the operating system running at the POP (Windows 2000), the name of the SOAP server (Apache SOAP V2.1), and the run-time environment (Java). Using this information, the deployment provider can then choose the correct implementation of the web service to deploy on that particular POP. The contents of the deployment run-time environment string can be as simple or as complex as needed for the overall environment. (That is, the parameter value may be empty if the same SOAP server is used throughout the environment and all web services in written in Java, for example; or, different or additional types of information might be provided. As an example of providing additional information, if multiple versions of a web service are available from the deployment provider, then the deployment facilitator may specify a version number for use by the deployment provider.)

Referring again to FIG. 4, after the deployment request is sent in stage 9, the deployment provider 280 then returns (in stage 10) a SOAP envelope to the deployment facilitator 230, where the SOAP envelope includes either an archive reference or a service archive (as discussed above with reference to element 560 of FIG. 5). As shown at 730 in the example SOAP envelope in FIG. 7, an enterprise archive (EAR) is included as a MIME attachment within the HTTP response transporting this SOAP envelope, in accordance with the SOAP Messages with Attachments specification which has been described. (Alternatively, a WAR or JAR might be included as an attachment to, or referenced from, the SOAP envelope.) As shown in the example at 710, an "href" attribute on a tag having a name such as "ArchiveRef" specifies an address that matches the content ID 720 in a binary attachment. (Alternatively, the href attribute may be omitted, assuming that the SOAP server is adapted to process the ArchiveRef tag and then issue a search against the Content ID elements of the attachments, using the content of the ArchiveRef tag.)

At stage 11, after receiving the SOAP envelope and attachments, the deployment facilitator 230 then accesses the local SOAP Server API to deploy the service on the client's POP 240. (The SOAP Server API is known in the art and does not form part of the present invention.)

Finally, at stage 12, the deployment facilitator 230 preferably returns a successful return code to the deployment node 260, which then updates the DNS entries in repository 452 to indicate that this web service is now deployed at edge server 240 (as shown at 448 in FIG. 4). By updating the DNS in this manner, subsequent requests for this service from those clients who use this edge server 240 as a POP will now be automatically routed to the service deployed at 448, rather than the service 495 deployed at the origin server 290.

As has been demonstrated, the deployment system of the present invention provides an extensible framework for deploying web services dynamically. Preferred embodiments, as described herein, use usage metrics to initiate service deployment. Other embodiments may use other triggering events without deviating from the inventive concepts disclosed herein. For example, the DN may monitor load on the network, and may use this information in the dynamic deployment decision of stage 8 instead of (or in addition to) the usage metrics which have been discussed. Because preferred embodiments of this deployment system leverage the web services stack of UDDI, WSDL, SOAP/XML Protocol, and HTTP, as has been described, they may be seamlessly integrated on a myriad of platforms. Edge servers represent one application platform which will make use of such a deployment system, and are described herein for purposes of illustration and not of limitation.

In optional enhancements of the present invention, an implementation may provide for dynamically undeploying and/or redeploying web services. These enhancements will now be described. (Note that while preferred embodiments of these optional enhancements are described with reference to the deployment process which has been described above, this is for purposes of illustration and not of limitation. The undeployment and redeployment techniques described below may also be used advantageously with services which have been otherwise deployed.)

First Optional Enhancement

Just as web services are deployed dynamically, an optional enhancement of the present invention enables a web service to be undeployed dynamically. In one aspect, this undeployment may be conditional or selective; in another aspect, it is unconditional. Each aspect will be described in turn.

To enable conditional undeployment, the usage metrics for a web service may be used to determine when the service should be undeployed. Typically, the usage metrics are the average number of usage requests received over a period of time. Based on this usage metric, a threshold may be set to indicate the utilization rate at which the service should be undeployed. The threshold is preferably stored at the deployment node 260, and may optionally be changed if necessary (e.g. by the deployment provider 280, by a systems administrator, etc.). For example, if the usage metric is the average number of requests per day for a month and the threshold is set at 100 requests per day, then the web service will be undeployed if the utilization rate at the end of a month drops below 100 requests per day. (In implementations where criteria other than usage requests determines the dynamic deployment of a service, the undeployment preferably reflects that other criteria.)

Preferably, this usage metric is maintained on the edge server 240. Using the example above, the usage metric is calculated by maintaining a usage counter for a period of time equal to one month. In this example, in order to calculate the usage rate, the edge server also stores the date that the count was started, and the usage counter is reset at the end of each month. Or, a sliding one-month interval may be used. (Note that it is not strictly required that each edge server maintain usage metrics for a particular service deployed on that server. In some implementations, it may be sufficient to accumulate representative usage metrics at selected edge servers.)

Although the usage metric is maintained on the edge server, the deployment node 260 is responsible for issuing the undeployment request according to preferred embodiments of this optional enhancement. The deployment node therefore monitors the utilization rate that will be used to determine when a web service on an edge server should be undeployed. Periodically, the deployment node may query each edge server to obtain the usage metrics. If the usage metric is less than the threshold value, then the web service is undeployed.

Figure 8:
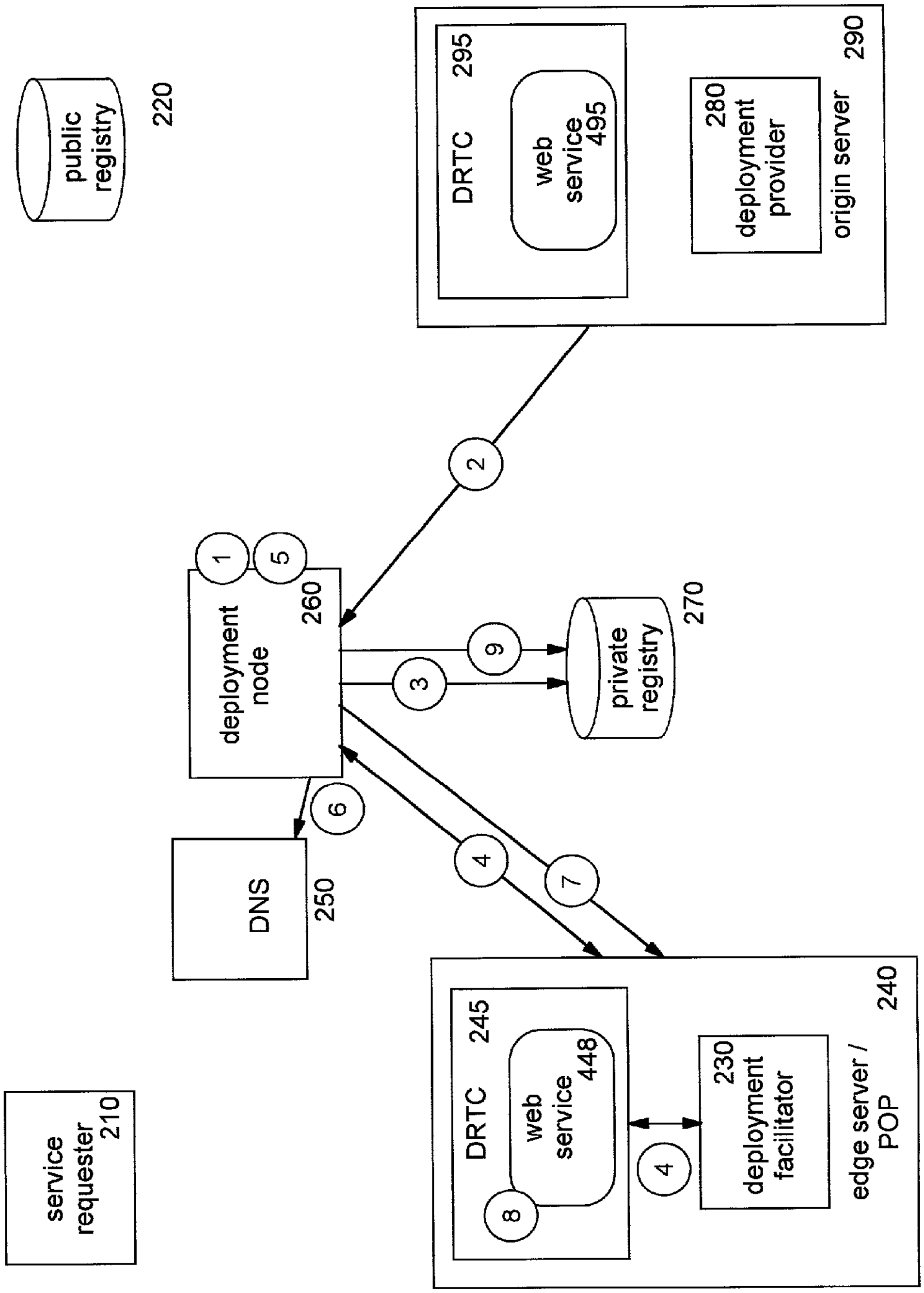
FIGS. 8 and 10 illustrate two approaches that may be used for dynamically undeploying services, according to an optional enhancement of the present invention.

After a web service is dynamically deployed according to the present invention, the following process is used in preferred embodiments to conditionally dynamically undeploy a web service. Referring now to FIG. 8, encircled numerals illustrate the flows and operations which may be used to carry out this process.

1. When the deployment node 260 is started, it is preferably configured to check the status of deployed services at a specified time interval. This time interval should be set based on the usage patterns for the deployed web services. The particular time interval used is not significant, and may be expressed (for example) in minutes, hours, days, weeks, or months.
2. When a new web service is deployed, an undeployment threshold value for that service is preferably stored on the deployment node 260. This threshold value may then be used to determine when a dynamically deployed web service should be undeployed.
3. At the specified time interval, the deployment node will obtain a list of all dynamically deployed web services. This list is obtained from the private registry 270, since a new business service entry is created in the registry for each dynamically deployed web service. This list will contain a reference to all of the deployment facilitators where web services have been deployed. The table 900 in FIG. 9 illustrates a simple example of a format in which this information may be stored. As shown therein, a service identifier 910 such as a UDDI binding key identifies each deployed service, and information 920 such as an IP address identifies where these services have been deployed. (Note that information in the table 300 of FIG. 3 and the table 900 of FIG. 9 may be merged, or may be separately stored, as desired.)
4. Each deployment facilitator 230 is sent a usage metrics request. In response, the deployment facilitator will obtain the usage metrics from the deployment run-time container and return them to the deployment node 260. (In each POP 240, each deployment facilitator 230 has access to the deployment run-time container 245, which provides the interface to the run-time environment for the web service. The deployment run-time container maintains the POP-specific usage metrics used for this undeployment mechanism.)
5. The deployment node 260 will compare the usage metrics to the threshold value. If the usage metrics are less than the threshold, the deployment node will start the undeploy process for the web service.
6. The undeploy process will start by sending a request to the DNS server 250 to remove the entry for the web service from the DNS repository 452. After this request is processed, the web service will not receive any further requests.
7. The deployment node will then send the deployment facilitator a request to undeploy the web service.
8. When a deployment facilitator receives an undeploy request, the web service 448 is shut down and the executable code for the web service is removed from the run-time environment on the edge server 240. After the undeploy request is completed, a response is preferably sent to the deployment node that indicates that the web service has been successfully undeployed (not shown in FIG. 8).
9. The deployment node will then remove the entry in the private registry for the web service that was undeployed.

In an aspect of this enhancement which provides unconditional undeployment, a web service is undeployed when it is no longer needed, or when it will be replaced by a new web service. For a web service that is statically deployed as in the prior art, there are two basic steps to the typical undeploy process.

1. Unpublish the service description for the web service from the service registry. After the service is unpublished, no one will be able to find the service description.
2. Remove the web service from the run-time environment. This includes an orderly shut down of the running web service, removal of any meta information required by the run-time environment, and removal of the web service's executable code from the run-time environment. (The deployment descriptor that is required to deploy a SOAP service is an example of this type of meta information.)

Figure 10:
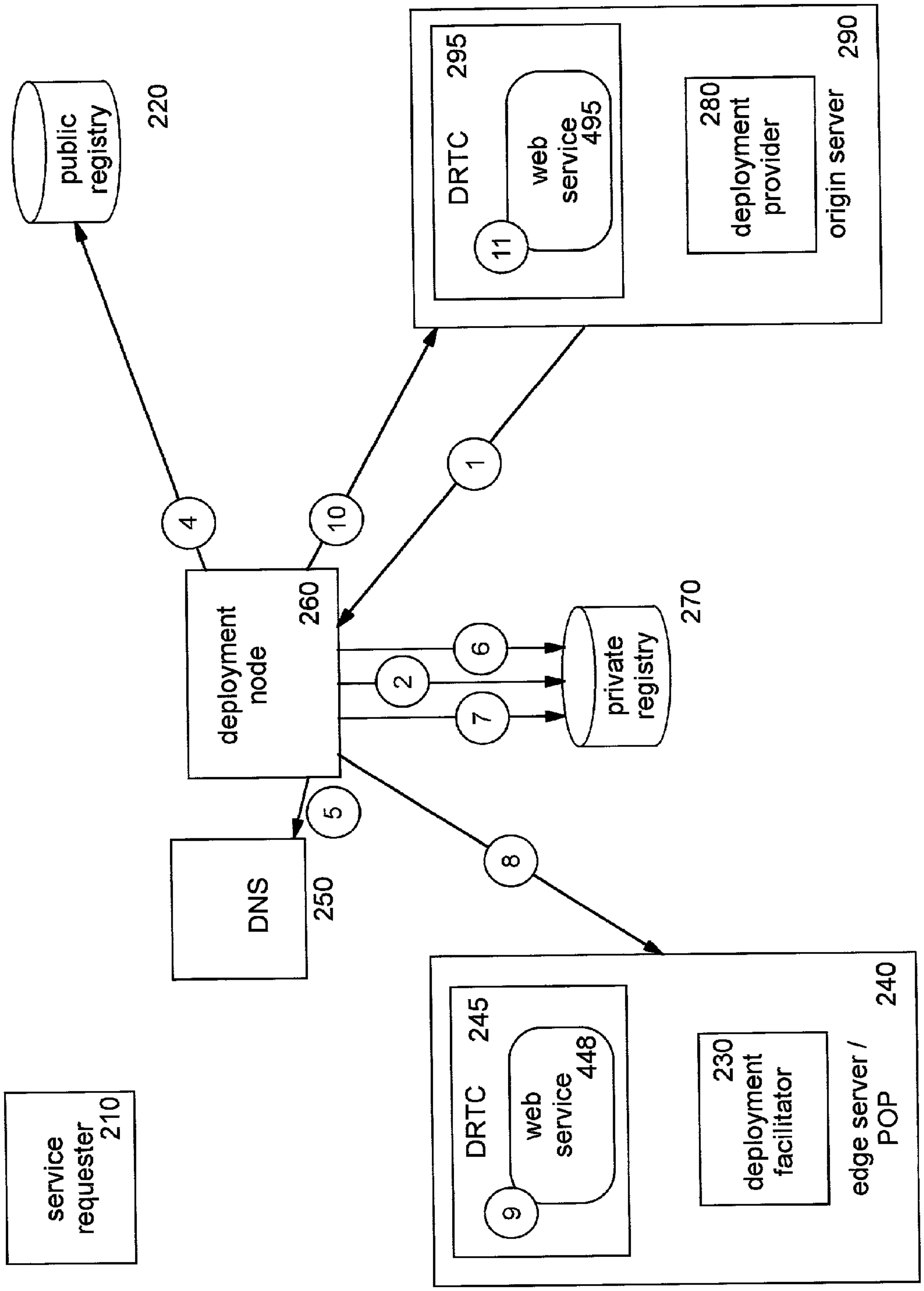

For services which are dynamically deployed according to the present invention, this undeployment process needs to be enhanced to undeploy the original web services, as well as all of the dynamically deployed web services. The manner in which this is accomplished in preferred embodiments will now be described with reference to FIG. 10, where encircled numerals correspond to the listed steps.

1. The deployment provider 280 will issue an undeploy request from the origin server 290 to the deployment node 260. The deployment provider is preferably the only participant in this scheme that is allowed to issue this type of request.
2. The deployment node will verify that the web service is deployed at its node, by searching for it in its private registry 270.
3. If the web service is found in the private registry, then the undeployment processing at the deployment node will continue. The deployment node is responsible for completing the undeployment request from the deployment provider. If the web service is not found in the private registry, then an error message is preferably sent back to the deployment provider (not shown in FIG. 10).
4. The deployment node will start the undeploy process by sending an unpublish request to the public registry 220. After this request is processed, service requesters 210 will not be able to find the web service description, but all of the web services will still be running.
5. After the unpublish request is completed, the deployment node notifies the DNS 250 server to remove all of the entries for the web service. When these entries are removed, the only version of the web service that can be accessed by a service requestor is the one running on the origin server.
6. The private registry on the deployment node 260 contains references to the deployment facilitators and the origin server 290. The deployment node will remove the entry for the origin server so that it will no longer forward service requests to the origin server.
7. The deployment node 260 will obtain a list of the deployment facilitators 230 where the web service was deployed. This list is obtained from the private registry 270, since a new business service entry is created for each dynamically deployed web service.
8. An undeploy request will be sent to each deployment facilitator in the list obtained at step 7.
9. When a deployment facilitator receives an undeploy request, the web service 448 is shut down and the executable code for the web service is removed from the run-time environment on the edge server 240. After the undeploy request is completed, a response is preferably sent to the deployment node that indicates that the web service has been successfully undeployed (not shown in FIG. 10).
10. When the deployment node has completed the undeploy request from the deployment provider, a response will preferably be sent to the deployment provider that indicates that the undeploy request has been completed.
11. The deployment provider will shut down the web service 495 that is running on the origin server and then remove the executable code.

Second Optional Enhancement

After a web service has been deployed initially, it may have to be updated (e.g. to fix defects or to add new functions). For a web service that is statically deployed according to the prior art, there are four basic steps to the typical web service update process.

1. Disable dynamic access to the web service by removing its entry from the service registry. After its entry is removed, a service requester should not be able to find the service description for the web service.
2. Remove the web service from the run-time environment. This includes an orderly shut down of the running web service, removal of any meta information required by the run-time environment, and removal of the web service's executable code from the run-time environment. An orderly shut down will verify that all outstanding requests are processed before shutting down the web service.
3. Deploy the updated web service code and meta information in the run-time environment, and then start the service.
4. Re-publish the service description for the web service. This will enable dynamic access to the web service.

Figure 11:
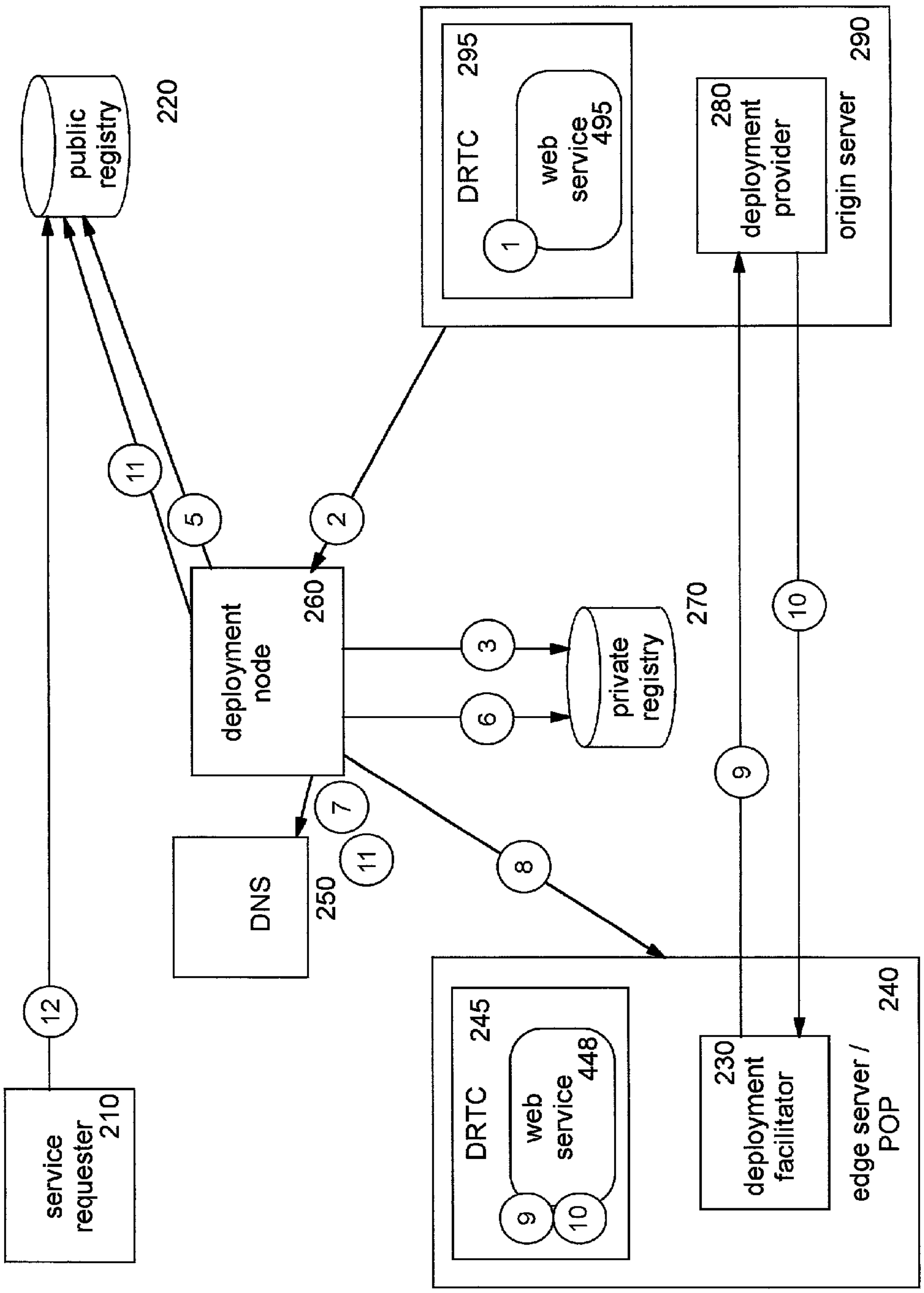
FIG. 11 illustrates a process that may be used for dynamically updating or redeploying services, according to another optional enhancement of the present invention.

For services which are dynamically deployed according to the present invention, this redeployment process needs to be enhanced to update the original deployed web service, as well as all of the dynamically deployed web services. Preferably, all of the web services should be updated, so that the update is available on all deployed systems at the same time. The manner in which this is accomplished in preferred embodiments will now be described with reference to FIG. 11, where encircled numbers correspond to the steps listed below.

1. The update process preferably starts when the deployment provider updates the web service on the origin server 290. This may be done by shutting down the web service, updating the service's executable code and meta information, and then starting the service again.
2. The deployment provider 280 will issue an update request from the origin server 290 to the deployment node 260. The deployment provider is preferably the only participant in this scheme that is allowed to issue this type of request.
3. The deployment node will verify that the web service has been deployed, by searching for it in its private registry 270. The private registry contains a reference to the web service that is deployed on the origin server 290, as well as all of the dynamically deployed web services.
4. If the web service is found in the private registry, then the update request will be processed by the deployment node. The deployment node is responsible for completing the update request from the deployment provider. If the web service is not found in the private registry, then an error message is preferably sent back to the deployment provider (not shown in FIG. 11).
5. The deployment node starts the update process by sending an unpublish request to the public registry 220. After this request is processed, service requesters 210 will not be able to find the web service, but all of the web services will still be running.
6. After the unpublish request is completed, the deployment node will obtain a list from its registry 270 of the deployment facilitators 230 where the web service was deployed.
7. For each web service on the list, the DNS server 250 is updated so that all requests are sent to the deployment node. While the update is being processed, the deployment node will preferably return an error message to any service requesters that try to access the service.
8. After the DNS server is updated, the deployment node sends an update request to each deployment facilitator in the list obtained in step 5. Preferably, this update request is formatted in a similar manner and uses a similar syntax as the deployment request which is sent in stage 8 of the deployment process (see FIG. 4), but differs in that it conveys that this is an update request.

9. When the deployment facilitator receives an update request, it will shut down the web service and then send a deployment request to the origin server to obtain the updated web service. In preferred embodiments, this (re)deployment request uses the same format and syntax which has previously been described with reference to stage 9 (see FIG. 4) of the deployment process.
10. After the deployment facilitator receives the updated web service package from the deployment provider 280, it will deploy the web service code and meta information in the runtime environment and then start the service.
11. When the deployment node has completed the update request from the deployment provider, it will send a request to the DNS server to re-activate the original DNS entries for the deployed web services and will publish the updated service description to the public registry 220.
12. After the service description is published, a service requestor can find the updated service description and use any of the updated web services. Service requests will be re-routed to the deployed web services by the DNS server, or will be routed to the deployment node and forwarded to the web service that is running on the origin server, in the manner which has previously been described for stages 5 and 6 of the deployment process. (Refer to FIG. 4 for a depiction of these flows, which have not been shown in FIG. 11.)
13. The update process is preferably completed when the deployment node sends a response to the update request to the deployment provider (not shown in FIG. 11).

Thus, it can be seen that use of either or both of the optional enhancements provides advantages in addition to the dynamic deployment technique which has been described.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems) and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A method of dynamically redeploying web services in a computing network, comprising:

receiving an update request, for a particular web service, from an origin server;

identifying, upon receiving the update request, deployments of the particular web service within the computing network;

sending, to a public registry of web services, an unpublish request regarding the particular web service;

sending, to each node hosting the identified deployments, a request to update the particular web service deployed on the node; and sending, to the public registry and after the requests to update the particular web service on the nodes have been sent, a publish request.

2. The method of claim 1, wherein the update request indicates that the particular web service has been revised.

3. The method of claim 1, further comprising sending, to a DNS node within the computing network, a request to update alter DNS entries for the deployments of the particular web service, and sending, to the DNS node and after the requests to update the particular web service on the nodes have been sent, a request to reactivate the DNS entries for the deployments of the particular web service.

4. The method of claim 1, wherein the identifying includes searching a private registry of web services.

5. The method of claim 1, wherein the request to update the particular web service deploy on the node is sent to a deployment facilitator resident on the node.

6. The method of claim 1, wherein the publish request includes an updated service description of the particular web service.

7. A computer hardware system for dynamically redeploying web services in a computing network, comprising:

an original server;

a plurality of edge servers;

a DNS node; and a deployment node, wherein the deployment node is configured to perform:

receiving an update request, for a particular web service, from the origin server;

identifying, upon receiving the update request, deployments of the particular web service within the computing network;

sending, to a public registry of web services, an unpublish request regarding the particular web service;

sending, to each of the plurality of edge servers hosting the identified deployments, a request to update the particular web service deployed on the edge server; and sending, to the public registry and after the requests to update the particular web service on the edge servers have been sent, a publish request.

8. The computer hardware system of claim 7, wherein the update request indicates that the particular web service has been revised.

9. The computer hardware system of claim 7, wherein the deployment node is further configured to perform sending, to the DNS node within the computing network, a request to update alter DNS entries for the deployments of the particular web service, and sending, to the DNS node and after the requests to update the particular web service on the edge servers have been sent, a request to reactivate the DNS entries for the deployments of the particular web service.

10. The computer hardware system of claim 7, wherein the identifying includes searching a private registry of web services.

11. The computer hardware system of claim 7, wherein the request to update the particular web service deploy on the edge server is sent to a deployment facilitator resident on the edge server.

12. The computer hardware system of claim 7, wherein the publish request includes an updated service description of the particular web service.

13. The computer hardware system of claim 7, wherein each edge server deploying the particular web service is configured to perform:

shutting down the particular web service on the edge server; and sending, to the original server, a request to obtain an updated version of the particular web service.

14. The computer hardware system of claim 13, wherein the origin server is configured to perform:

updating the particular web service within the original server; and forwarding, to a requesting edge server, the updated version of the particular web service.

15. A computer program product comprising a computer usable storage medium having stored therein computer usable program code for dynamically redeploying web services in a computing network, the computer usable program code, which when executed by a computer hardware system, causes the computer hardware system to perform:

receiving an update request, for a particular web service, from an origin server;

identifying, upon receiving the update request, deployments of the particular web service within the computing network;

sending, to a public registry of web services, an unpublish request regarding the particular web service;

sending, to each node hosting the identified deployments, a request to update the particular web service deployed on the node; and sending, to the public registry and after the requests to update the particular web service on the nodes have been sent, a publish request.

16. The computer program product of claim 15, wherein the update request indicates that the particular web service has been revised.

17. The computer program product of claim 15, wherein the computer usable program code further causes the computer hardware system to perform sending, to a DNS node within the computing network, a request to update alter DNS entries for the deployments of the particular web service, and sending, to the DNS node and after the requests to update the particular web service on the nodes have been sent, a request to reactivate the DNS entries for the deployments of the particular web service.

18. The computer program product of claim 15, wherein the identifying includes searching a private registry of web services.

19. The computer program product of claim 15, wherein the request to update the particular web service deploy on the node is sent to a deployment facilitator resident on the node.

20. The computer program product of claim 15, wherein the publish request includes an updated service description of the particular web service.

* * * * *